United States Patent
Groarke et al.

(10) Patent No.: US 11,037,161 B2
(45) Date of Patent: Jun. 15, 2021

(54) SYSTEM AND METHOD FOR PREVENTING MULTIPLE REFUNDS AND CHARGEBACKS

(71) Applicant: Mastercard International Incorporated, Purchase, NY (US)

(72) Inventors: Peter Groarke, Dublin (IE); Peter Corrigan, County Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 236 days.

(21) Appl. No.: 15/705,882

(22) Filed: Sep. 15, 2017

(65) Prior Publication Data

US 2018/0025357 A1    Jan. 25, 2018

Related U.S. Application Data

(63) Continuation of application No. 13/564,370, filed on Aug. 1, 2012, now Pat. No. 9,785,945.

(51) Int. Cl.
*G06Q 20/40* (2012.01)
*G06Q 10/10* (2012.01)

(52) U.S. Cl.
CPC ......... *G06Q 20/4016* (2013.01); *G06Q 10/10* (2013.01)

(58) Field of Classification Search
CPC ............................ G06Q 20/4016; G06Q 10/10
USPC .......................................................... 705/35
See application file for complete search history.

(56) References Cited

U.S. PATENT DOCUMENTS

| | | | |
|---|---|---|---|
| 7,228,313 B1* | 6/2007 | Hand | G06Q 10/02 |
| 7,257,581 B1 | 8/2007 | Steele et al. | |
| 7,318,047 B1* | 1/2008 | Foth | G06Q 20/02 705/26.4 |
| 8,032,765 B2 | 10/2011 | Dettinger et al. | |
| 8,037,471 B2 | 10/2011 | Keller et al. | |
| 8,311,944 B2 | 11/2012 | Knowles et al. | |
| 2001/0043599 A1 | 11/2001 | Redmond | |
| 2003/0135453 A1* | 7/2003 | Caulfield | G06Q 20/04 705/38 |
| 2003/0163483 A1 | 8/2003 | Zingher et al. | |
| 2005/0038738 A1* | 2/2005 | Peck | G06Q 20/04 705/40 |

(Continued)

OTHER PUBLICATIONS

"Benefits of Open Payment Systems and the Role of Interchange", MasterCard Worldwide, U.S. Version. 2008, pp. 1-12.

(Continued)

*Primary Examiner* — Joseph W. King
(74) *Attorney, Agent, or Firm* — Ohlandt, Greeley, Ruggiero & Perle, LLP

(57) ABSTRACT

A system and a method for determining whether a refund has been issued by at least one of multiple parties having potential responsibility for issuing a refund. Issuance of multiple refunds to a claimant or claimants, or chargebacks to acquirers when a refund has been issued is prevented. The system includes an electronic storage device that has a database of data concerning transactions, including data as to whether a refund has been issued, an access path that allows access to and supplementing of data concerning a transaction, and a processor for assembling the data concerning the transaction so that access is provided to the multiple parties granted selected access to the data.

15 Claims, 4 Drawing Sheets

(56) References Cited

U.S. PATENT DOCUMENTS

| | | |
|---|---|---|
| 2005/0192884 A1* | 9/2005 | Raines ............... G06Q 20/0453 |
| | | 705/35 |
| 2007/0192229 A1 | 8/2007 | Rowan |
| 2007/0250440 A1* | 10/2007 | Paulsen ................. G06Q 20/02 |
| | | 705/39 |
| 2008/0103967 A1* | 5/2008 | Ackert ................... G06Q 20/10 |
| | | 705/39 |
| 2009/0119209 A1 | 5/2009 | Sorensen et al. |
| 2009/0287536 A1 | 11/2009 | Sheng |
| 2010/0076813 A1 | 3/2010 | Ghosh et al. |
| 2010/0138326 A1* | 6/2010 | Joao ....................... G06Q 20/04 |
| | | 705/30 |
| 2011/0125393 A1 | 5/2011 | Williams et al. |
| 2012/0036042 A1 | 2/2012 | Graylin et al. |
| 2012/0053969 A1 | 3/2012 | Schukraft |
| 2012/0150742 A1 | 6/2012 | Poon et al. |
| 2012/0185368 A1 | 7/2012 | Schloter et al. |

OTHER PUBLICATIONS

Christian von Weizsacker, "Economics of Credit Cards—Expert Report on behalf of MasterCardl International Incorporated and Europay International SA", Jan. 23, 2002, pp. 1-29.

John Bulmer. "Payment Systems: The Credit Card Market in Canada", Library Bibliotheque of Parliament duParlement, Sep. 24, 2009, pp. 1-8.

U.S. Appl. No. 13/537,737, filed Jun. 29, 2012.
U.S. Appl. No. 13/538,226, filed Jun. 29, 2012.
U.S. Appl. No. 13/538,270, filed Jun. 29, 2012.
U.S. Appl. No. 13/538,305, filed Jun. 29, 2012.
U.S. Appl. No. 13/564,321, filed Aug. 1, 2012.
U.S. Appl. No. 13/564,398, filed Aug. 1, 2012.
U.S. Appl. No. 13/655,008, filed Oct. 18, 2012.

\* cited by examiner

SYSTEM AND METHOD FOR PREVENTING MULTIPLE REFUNDS AND CHARGEBACKS

CROSS-REFERENCE TO RELATED APPLICATIONS

This application is a continuation of pending U.S. patent application Ser. No. 13/564,370, filed Aug. 1, 2012, the entirety which is incorporated herein by reference.

BACKGROUND OF THE DISCLOSURE

1. Field of the Disclosure

The present disclosure relates to payment card systems. More particularly, it relates to a system and/or method for preventing fraud with respect to refunds and chargebacks associated with transactions conducted on payment card and other payment systems.

2. Description of the Related Art

The first credit payment systems were two party systems in which a merchant sold goods to a customer without requiring full or any initial payment. In this system, the customer paid for the goods at a later date, or made periodic payments over a predetermined period of time. These methods of payment are of limited scope and not flexible since it involves only one merchant and the customer must make individual arrangements with each and every merchant, and for each and every transaction.

In a three party system, a single card issuer contracts with customers and issues credit cards to them. The issuer also contracts with merchants, who agree to make sales to customer having a credit card from the issuer. When a card is presented at a merchant's establishment, it is generally the issuer who approves the transaction and pays the merchant. However, this system, a so-called closed system, has occasionally been modified so that another party approves the transaction and interacts with the merchant.

MasterCard, the assignee of the present application, operates within what is known as a "four-party" payment card system. The four key participants in a four-party system are: (i) the consumer and business cardholders that use the cards; (ii) the merchants that accept the cards; (iii) the financial institutions that issue the cards (referred to as the card issuer); and (iv) the financial institutions that sign up merchants to accept the cards (referred to as the acquirer). In a typical four-party payment card transaction, the merchant pays a "merchant discount fee" (i.e., a merchant service charge) to the acquirer in recognition of the services provided by the acquirer in facilitating payment card acceptance by the merchant. However, a substantial portion of the benefits that the merchant receives through card acceptance comes from the value of the network and services performed by the card issuer. For example, the card issuer underwrites and extends credit to the cardholder of a credit card, which enables the sale, and the card issuer assumes the risk of nonpayment by the cardholder, which enables the merchant to get paid for the transaction even if card issuer does not. To compensate the card issuer for providing such benefits to the acquirer's merchant customer, the acquirer pays an "interchange fee" to the card issuer in connection with a payment card transaction. The interchange fee helps to partially reimburse the card issuer for the many activities it performs and costs it incurs that enable the acquirer to provide significant benefits and value to its merchant customers. Interchange fees are only one of the many cost components of the merchant discount fees that are established by acquirers and paid by merchants in exchange for card acceptance services provided by acquirers to merchants.

One problem that banks and merchants face is customer chargebacks with respect to credit card purchases. A chargeback in the payment card industry is a transaction initiated by the issuer on a cardholder's behalf in order to reverse a prior transaction. In a chargeback transaction, it is the acquirer who is debited for the chargeback and who then passes the debits on to the associated merchant. However, in the case of the merchant going bankrupt, the acquirer may be left with a significant loss as the loss is generally not recoverable from the associated merchant.

The problem is particularly acute in the case of credit card purchases of, for example, airline tickets. It is normal practice for airlines to debit cardholders at the time of airline ticket booking, which is generally well in advance of the service being delivered to the cardholder (in this case the service is the airline flight).

There exist several parallel systems for reimbursing airline tickets other than via credit card chargebacks. These include a traveler's private insurance policy, industry bonds, travel agents insurance, and airline liquidators who pay off the debts of an airline when it ceases operations and its assets are sold.

A significant problem is that these parallel systems are not connected to one another and there is no easy approach for an acquirer handling an airline ticket chargeback to determine if the cardholder has already received a refund from one of these parallel systems. It is not uncommon, in airline bankruptcy events, for unscrupulous travelers to receive refunds multiple times, using more than one of these parallel systems.

Thus, there are situations in which a refund of a purchase price must be provided to a customer or claimant. In some cases the customer or claimant has access to more than one source of a refund. There is a potential for fraud or abuse when a refund or chargeback is provided.

SUMMARY OF THE DISCLOSURE

There is provided a system (and a method) for determining whether a refund has been issued by at least one of multiple parties having potential responsibility for issuing a refund, and fraud and abuse are prevented.

There is also provided such a system (or method) in which issuance of multiple refunds to a claimant or claimants, or chargebacks to acquirers is prevented.

There is further provided in accordance with this disclosure, a refund database that prevents multiple refunds and thus reduces chargebacks.

The present system includes an electronic storage device that has a database of transactions, where each transaction has information as to whether a refund has issued, an access path that allows access to the database and for allowing supplementing of the data for a selected transaction, and a processor for assembling data in the database for selected transaction. The system also provides to multiple parties selected access to the assembled data.

The present disclosure is also directed to a computer readable non-transitory storage medium storing instructions of a computer program which when executed by a computer system result in performance of steps of the method described, for determining whether a refund has been issued by at least one of multiple parties having potential responsibility for issuing a refund, and for preventing chargebacks when a refund has been issued.

BRIEF DESCRIPTION OF THE DRAWINGS

A component or a feature that is common to more than one drawing is indicated with the same reference number in each of the drawings.

DESCRIPTION OF THE PREFERRED EMBODIMENT

Figure 1:
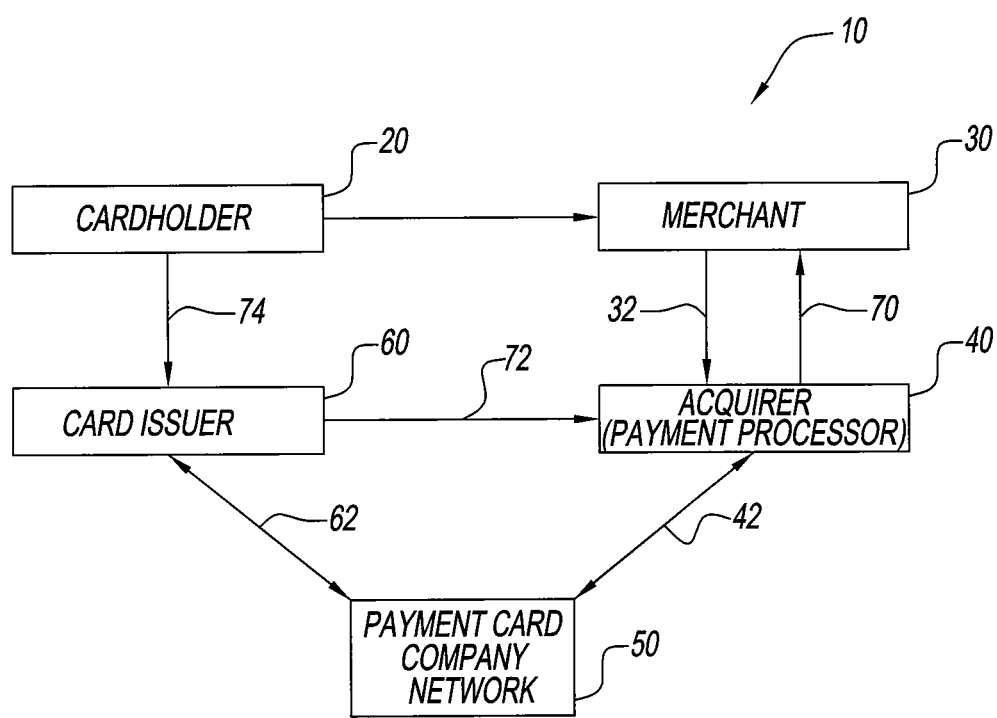
FIG. 1 is a diagram of a four party payment card system.

Referring to the drawings and, in particular, FIG. 1, there is shown a four party system 10. The cardholder 20 submits the credit card to the merchant 30. The merchant's point of sale device (80 in FIG. 2) communicates 32 with his acquiring bank or acquirer 40, which acts as a payment processor. The acquirer 40, at 42, initiates the transaction on the payment card network 50. The payment card network 50 routes the transaction to the issuing bank or card issuer 60, which is identified using information in the transaction message, more fully described below. The card issuer 60 approves or denies an authorization request. At 62, the card issuer 60, then routes, via the payment card network 50 an authorization response back to the acquirer 40. The acquirer 40 sends approval to the POS device of the merchant 30. Seconds later the cardholder completes the purchase and receives a receipt.

The account of the merchant 40 is credited at 70 by the acquirer 40. The card issuer 60 pays the acquirer at 72. Eventually, at 74, the cardholder 20 pays the card issuer 60.

Figure 2:
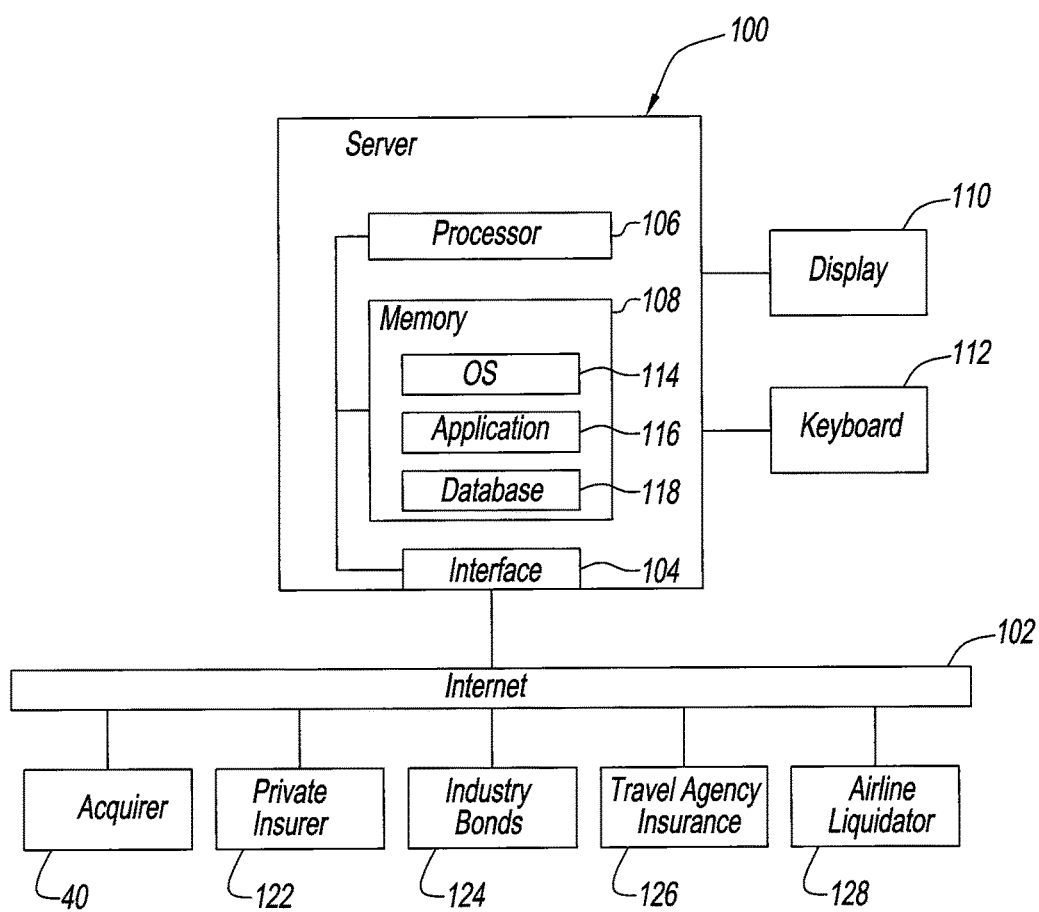
FIG. 2 is a block diagram of a chargeback management system in accordance with one aspect of the present disclosure.

Referring to FIG. 2, in the embodiment disclosed herein, a server 100 is connected to the Internet 102 by an interface 104. Server 100 includes a data processor 106 and a memory 108. Server 100 is connected to a display 110 and a keyboard 112. It will be understood that server 100 may have associated with it a plurality of other peripheral devices customarily found in any computer, such as for example a CD or DVD drive (not shown) for placing programs on server 100 or for creating physical records of data processed by server 100.

Memory 108 may have a portion 114 for an operating system for server 100, a portion 116 for one or more application programs, including one that is the subject of this disclosure, and a portion 118 used as the storage for a database, as more fully described below.

Server 100 operates as a chargeback and refund management system, by saving data on chargebacks and refunds posted by user organizations that include, but are not limited to, acquirers 40, private insurers 122, bond organizations 124, travel agency associated insurers 126 and airline liquidators 128. As described below, all of these users or parties can participate in the use of server 100 to defeat or minimize the payment of fraudulent, duplicates claims.

Database 118 includes a record for each item. For example, in the airline industry, there is an airline ticket for which a chargeback is requested. The record includes fields for the following data:

A) The airline ticket number (a unique identifier); B) a refund event identifier, which is unique in combination with the airline ticket number; and C) a refund entity identifier specifies the organization that is refunding the price of the airline ticket in whole or in part. This identifier may link to additional refunding entity information such as a company name, address, unique company identification number, contact individual, etc. The data also includes D) an amount of the refund for the refund event, and an associated currency code. A refund can potentially be for a portion of the ticket price or for the full ticket price. If there is more than one source of insurance, the record for the airline ticket will include a second refund event identifier, a second refund entity identifier, second amount refunded, and the associated currency code.

As discussed in more detail below, the record for a transaction, such as the sale of an airline ticket, may include one or more links to documents in database 118 that are relevant as to whether a particular user is responsible for reimbursing a claimant. These links may be associated with a list of all documents relevant to the transaction. The list can be accessed by clicking on an appropriately labeled portion of a display screen. Clicking on a document in the list can open a window in which the entire document may be available for review by the user of the system.

The data of the database 118 may be stored in any type of memory, including a hard drive, a flash memory, on a CD, in a RAM, or any other suitable memory, with provisions for suitable backup, as is well known in the art.

Figure 3:
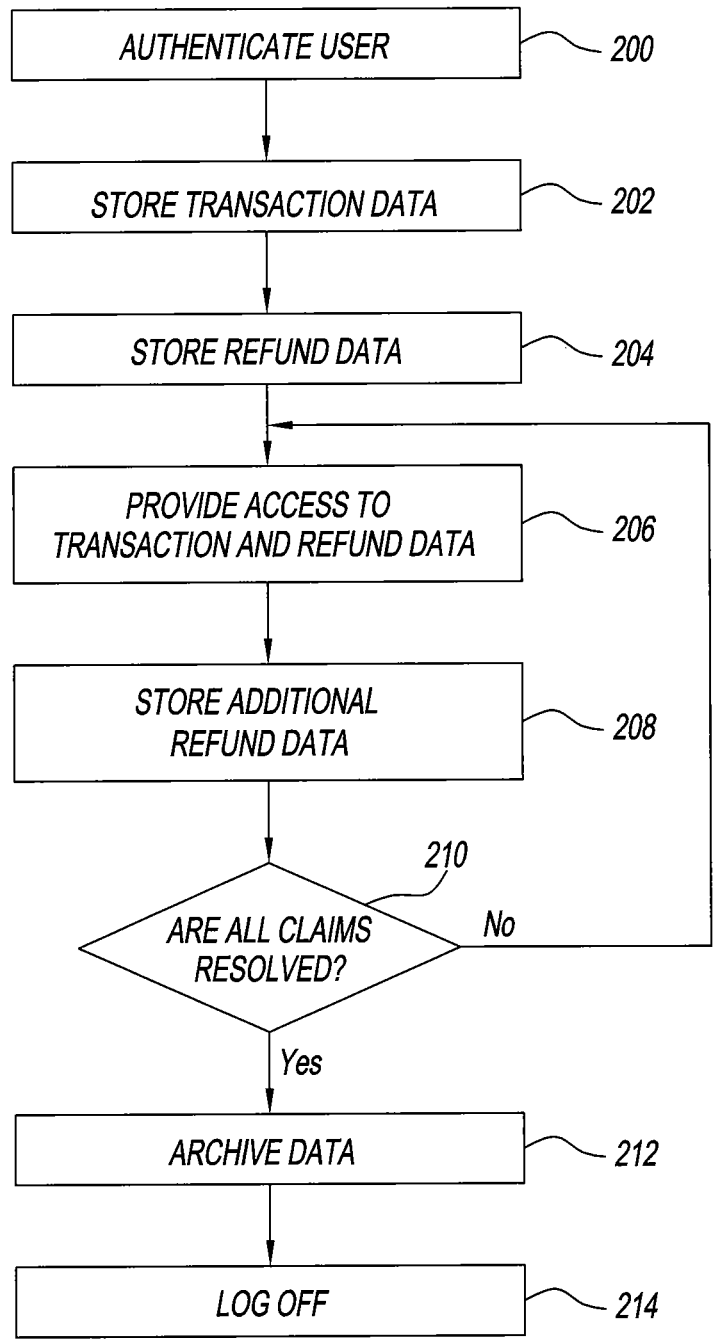
FIG. 3 is a flow chart representing the manner in which data is entered and accessed in the system of FIG. 2.

Referring to FIG. 3, the operation of the database 118 is described. Any of the users 40, 122, 124, 126, 128 of system 100 can log on to the system via the Internet 102 (FIG. 2) and be authenticated 200 by using a user name and password. The first time a particular refund transaction is considered, transaction data, such as for example, an airline ticket number is stored 202. If a refund is being issued refund data is stored 204. Upon subsequent access, access can be provided to transaction and refund data 206. Additional refund data may be stored 208. If all claims appear to be resolved 210, all of the data is archived 212 and the user logs off at 214. If all claims are not resolved, transaction refund data is again accessed 206, additional data is stored 208, and a determination is made again 210 as to whether all claims have been resolved.

Figure 4:
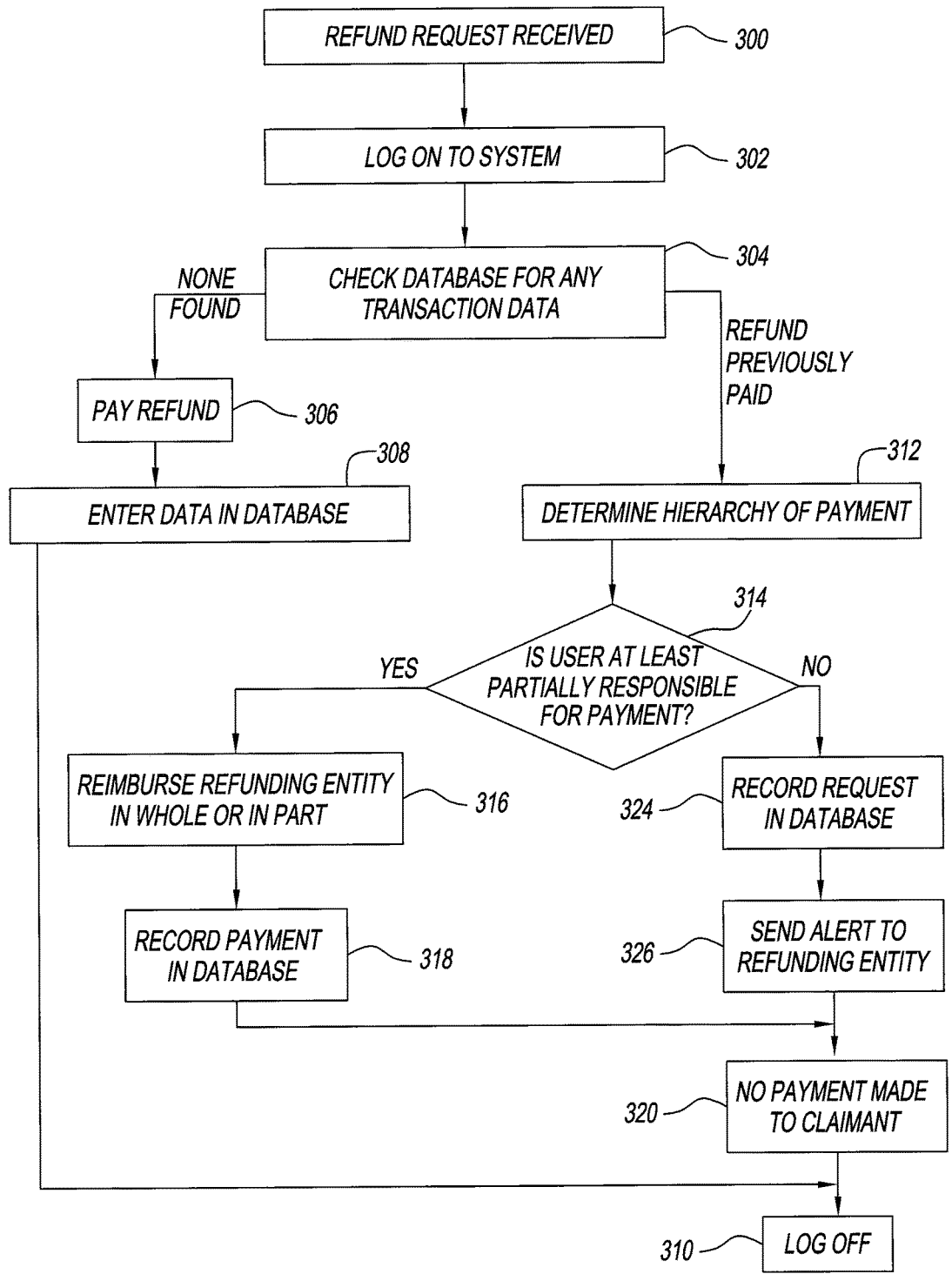
FIG. 4 is a flow chart illustrating the manner in which the system in accordance with the present disclosure is used.

FIG. 4 illustrates the manner in which the user having access to system 100 checks for and resolves multiple refund request situations. A refund request 300 is received. The user then logs on 302 to the system 100. The database 118 is checked, using the unique identification number (the airline ticket number) for any transaction data 304. If no transaction data is found, a refund is paid 306, all of the data is entered 308 in the database 118 and the user may log off 310. However, if the data in database 118 indicates that a refund was previously paid, a determination as to the hierarchy of payment as required by the existing agreements and policies 312 is made. In this regard, a portion of the database 118 may be used to store documents relating to refunds that were previously paid including credit card agreements, insurance policies, the terms of industry bonds, and even court documents related to a bankruptcy and consequent liquidation of, for example, an airline. A determination is made as to whether the current user of the system is at least partially responsible for payment 314 to the claimant. If the entity currently using system 100 is at least partially responsible for payment based on the determined hierarchy of payment, a partial or total reimbursement 316 is made to the entity that previously provided a refund. Data concerning the payment made is appended 318 to the record in the database 118 for the transaction. Since the claimant has already been paid, there is no payment 320 made to the claimant. The user can then log off 310. It is possible to configure system 100 so that it automatically generates an e-mail or letter to the claimant informing the claimant that no refund will be issued on the claim, in view of the claim having been paid by another party. Alternatively, the user can issue a denial of refund request to the claimant.

If the user of the system has no responsibility 314 for payment, data representative of the request having been made is appended 324 to the transaction record stored in the database 118, an alert is sent to an entity that paid the refund 326, no payment 320 is made to the claimant, and the user may log off 310.

Determining the hierarchy of payment 312 may not always be a task with a well-defined outcome. This may be due, at least in part, to conflicts or unresolved ambiguities in the various governing documents. For example, insurance coverage often provides for subrogation of claims, so that if the insurer pays, another party, who caused the insurance company to pay, may be responsible for the amount paid out by the insurance company. Thus, as described above, in general, the use of system 100 should always record a request for payments 324 in database 118 even if no payment has been made. In this way, users can scan transactions for which they have made payments, and determine if another entity has made a determination that the other entity is not responsible for payment. In addition, if a second entity makes a request for information as to whether a payment has been made for a transaction record, the entity making the payment is automatically alerted 326 that another entity has made an inquiry. This provides an opportunity for the various entities using system 100 to contact one another about specific payments or groups of payments in an attempt to resolve differences concerning the proper hierarchy of payment. In some cases it may be necessary to resort to arbitration or to the courts to make a determination as to which of two or more entities may be responsible for payment to a claimant or set of claimants. Records of such decisions may also be stored and indexed in database 118 as historical data to assist users of database 118.

Various approaches, technologies and pathways that can be used to access system 100. In general, the internet can be used and access may be granted to a home or a business computer, including a desk top, lap top, or notebook computer, from a personal digital assistant, or any other Internet connected device, such as a tablet (for example, a device such as an iPad®).

Various types of alerts such as telephone calls, text messages, instant messages and e-mails can be used at 326. However, if speed of response is important, a so called "push" technology should be used, where information is "pushed" out to the user, rather than waiting until the user decides to log on and scan the database 118 for inquires made on claims already paid.

The system 100 and database 118 should provide atomic write access so as to ensure data consistency. Read and write access to the database 118 are controlled by an authentication mechanism, such as a user name and password, as discussed above, or other similar approach. Read and write privileges are distinct. Not all users need to have write access. For example, if a scan is being done to determine what inquiries have been made but were not paid, no records need be changed.

The manner in which the owner of system 100 exploits the present system and/or method can vary. The server 100 can be accessed via a web site and can be available for free to selected merchants; for example those having at least a given monthly or annual sales volume. Alternatively, a user fee may be charged, on a time of use, or periodic basis (such as monthly). System 100 may be made available only to merchants conducting transactions with cardholders of the type of card being used to make those transactions, or only for free to such merchants. The system may be configured, with appropriate safeguards, to permit the payments to claimants, and between parties using the system, to be made using the system itself, for a small percentage of the payment as a service charge. There are other possibilities for providing access to the system 100, and for exploiting its use as a service. If an entity wishes to participate in the use of system 100, it is preferable to have an agreement in place between the owner of system 100 and the participating entity, concerning the terms of such use.

Thus, it is clear that the embodiments described herein benefit acquiring banks in that if there are reimbursement vehicles other than chargebacks available, the acquirer can be reimbursed for the chargeback. However, it also helps all entities that have some financial responsibility with respect to the transaction, because by using the disclosed system, any attempt by a claimant to collect multiple times for the same loss will be detected. Further, a judgment can be made as to which entity has primary responsibility for paying the claim, or a portion of the claim. The system and/or method described herein, if used by the relevant entities, greatly reduce unnecessary duplicate payments.

It will be understood that while the present disclosure has been described primarily with respect to the four party credit card system, it can also be applied, as noted above, to a three party credit card system. Further, with suitable modifications, as will be understood by one skilled in the art, it can be applied to other kinds of payment card systems, such as debit card charging systems.

It will be understood that the present disclosure may be embodied in a computer readable non-transitory storage medium storing instructions of a computer program which when executed by a computer system results in performance of steps of the method described herein. Such storage media may include any of those mentioned in the description above.

The terms "comprises" or "comprising" are to be interpreted as specifying the presence of the stated features, integers, steps or components, but not precluding the presence of one or more other features, integers, steps or components or groups thereof.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for determining whether a refund should be issued, the method being performed by a chargeback and refund management server that comprises one or more processors, a memory operatively coupled to at least one of the processors, and a computer-readable storage medium encoded with instructions executable by at least one of the processors, the method comprising:

receiving chargeback and refund data from a plurality of user organizations into the chargeback and refund management server, the chargeback and refund data including a plurality of documents for agreements and policies amongst the user organizations;

storing, in a database in communication with the server, the chargeback and refund data, the chargeback and refund data including a refund transaction record for a refund event comprising:
- a unique identifier of a purchased item,
- a refund event identifier for the refund event,
- an organization identifier specifying each user organization of the plurality of user organizations that is partially or fully refunding a price of the purchased item, and, any refund amount issued for the refund event;

storing, in the database, the plurality of documents that includes the agreements and policies requiring a hierarchy of payment between at least a first and a second of the user organizations having a shared responsibility for payment of the refund event;

generating, in the refund transaction record, one or more links to one or more of the documents that includes the agreements and polices requiring the hierarchy of payment between the at least the first and the second of the user organizations having the shared responsibility for payment of the refund event;

receiving, from a purchaser of the purchased item, a refund request for the purchased item;

in response to receiving the refund request, identifying the unique identifier of the purchased item associated with the purchased item;

checking the database for the refund event identifier of the purchased item using the unique identifier;

determining if a first refund has already issued and, if so, identifying, via the organization identifier, which of at least the first and the second user organizations has paid the refund;

displaying on a portion of a display of a user device logged on the refund management server, a display element configured to activate the one or more links to the one or more documents;

automatically launching one or more windows on the display of the user device in response to activating the one or more links to show the one or more of the documents corresponding the activated one or more links;

when the first refund has already been issued, indicating the purchase price of the refund partially or fully paid, and determining, via the one or more documents displayed in the one or more windows, the hierarchy of payment of the fully refund as required by the existing agreements and policies between at least the first and the second user organizations having the shared responsibility for payment of the full refund, and determining whether a further refund or a reimbursement of the user organization that paid the first refund is warranted; and automatically generating and sending an alert or communication to one or more of the user organizations having the shared responsibility for payment of the refund event based on the determination that a further refund or reimbursement is warranted.

2. The method of claim 1, further comprising:
supplementing the refund transaction record having a first refund amount with a second refund amount of the refund should a further refund be warranted and a second organization identifier for the second user organization that provided the second refund amount; and
reimbursing the first user organization that paid the first refund.

3. The method of claim 1, wherein the one or more documents are at least one document selected from the group consisting of: a credit card agreement, an insurance policy, a terms of industry bonds, and a court document related to a bankruptcy and liquidation.

4. The method of claim 1, further comprising:
executing the instructions to perform the operation of automatically sending the alert by sending the alert to the second user organization that has issued the further refund when the first user organization has accessed the database for data relating to the refund event.

5. The method of claim 1, further comprising:
configuring the database to be accessible by a web site.

6. The method of claim 5, further comprising:
configuring the chargeback and refund management server with an interface to provide Internet access to the database by an Internet connected user device.

7. The method of claim 6, further comprising
authenticating at least one user accessing the database via the Internet accessible interface of the chargeback and refund management server;
determining if the user is accessing the chargeback and refund management server for the refund request from the purchaser;
storing the transaction data in the database at the first time when the refund request from the purchaser is considered,
providing subsequent access to the refund transaction data to the at the least one user accessing the database via an Internet accessible interface of a chargeback and refund management server;
storing additional refund transaction data for the refund request to the database.

8. The method of claim 1, further comprising:
executing the instructions to perform the operation of issuing a denial of the refund request to the purchaser.

9. The method of claim 1, further comprising:
reimbursing at least one of the first and the second user organizations in whole.

10. The method of claim 1, further comprising:
reimbursing at least one of the first and the second user organizations in part.

11. The method of claim 1, further comprising:
executing the instructions to perform the operation of automatically generating a communication to the purchaser, informing the purchaser that no refund will be issued.

12. The method of claim 1, further comprising:
executing the instructions to perform the operation of automatically generating communication to a purchaser, informing the purchaser that the claim has been paid by another party.

13. The method of claim 1, further comprising configuring the database so the chargeback and refund data includes data for a sale of a ticket.

14. The method of claim 13, further comprising configuring the database so the refund transaction record for the refund event includes a unique number for the ticket.

15. The method of claim 1, further comprising:
determining if all refund claims for the refund request are resolved; and when all refund claims are resolved, archiving the refund data.

\* \* \* \* \*